July 18, 1950
J. J. DRANEY
2,515,639
SAFETY DEVICE FOR PRESSURIZED AIRCRAFT
Filed April 23, 1947
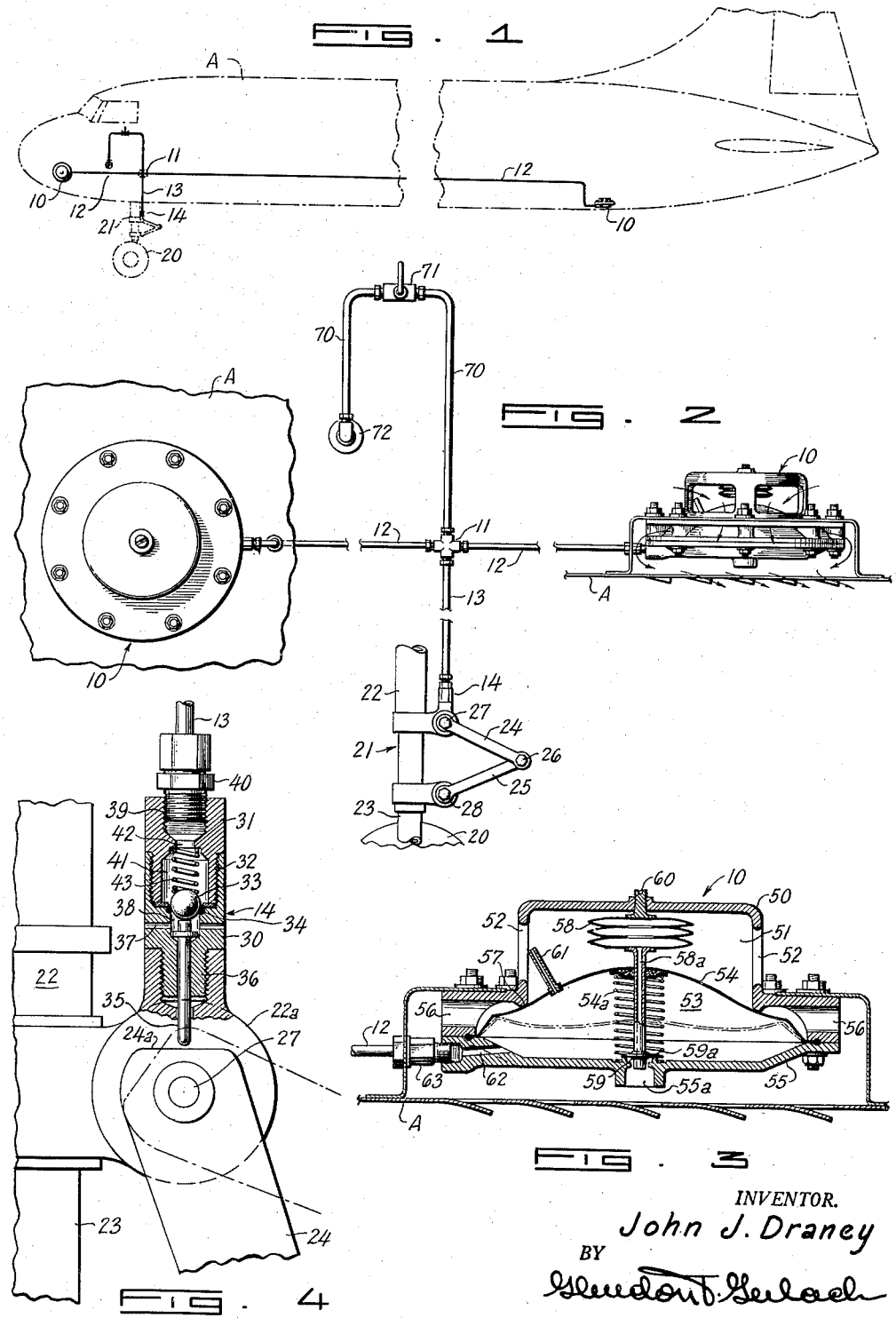
INVENTOR.
John J. Draney
BY
ATTORNEY Patented July 18, 1950

2,515,639

UNITED STATES PATENT OFFICE 2,515,639

SAFETY DEVICE FOR PRESSURIZED AIRCRAFT

John J. Draney, La Mesa, Calif., assignor to Consolidated Vultee Aircraft Corporation, San Diego, Calif., a corporation of Delaware Application April 23, 1947, Serial No. 743,369

4 Claims. (Cl. 244—118)

This invention relates to safety means for automatically equalizing the air pressure within a supercharged airplane cabin to the existing ground atmospheric pressure upon landing.

In aircraft provided with pressurizing systems to maintain livable internal presures at high altitudes the possibility exists that upon landing the air within the cabin is at a higher pressure than that of the surrounding atmosphere. Under these conditions, serious consequences may result from unlatching the cabin doors or other openings into the aircraft, since the pressure differential between the interior of the aircraft and the exterior will result in a sudden ejection of large masses of air with consequent injury to the occupants of the airplane, or damage to its structure.

The primary object of the present invention is to provide a simple and positive means for automatically equalizing the internal air pressure of an airplane to the ground atmospheric pressure, actuated upon contact of the aircraft with the ground or other landing medium.

A further object of the invention is to provide automatic means for equalizing the internal pressure of an aircraft with the surrounding atmospheric pressure by actuation of a release valve when the landing gear contacts the landing medium.

Further objects and advantages of the invention will be apparent from the following specification and the sub-joined claims, and by reference to the accompanying drawings in which like numerals indicate like parts and in which:

Fig. 1 illustrates a schematic installation of this invention in a typical airplane;

Fig. 2 is an enlarged detail view of the elements shown in Fig. 1;

Fig. 3 is a sectional view showing the operation of a form of pressure relief valve;

Fig. 4 is an enlarged section of the landing gear actuated release mechanism.

Referring to Fig. 1, A represents an airplane in which the fuselage or cabin is sealed in such a manner that the internal pressure may be maintained at higher values than that of the surrounding atmosphere by means of a supercharging system which is not shown, but is well understood in the art. In operation, the airplane is sealed upon take-off, and the comfort of the airplane's occupants maintained by simulating ground atmospheric pressures when the airplane is flown at altitudes at which the external air pressure is uncomfortable, or even considerably lower than that necessary to support life. The airplane A is provided with one or more pressure relief valves 10 which are mounted in the skin of the sealed portion of the airplane and serve as outlets for the release of the air within the airplane to maintain a predetermined internal pressure under the control of mechanism (not shown) which is generally mounted in a position whereby the pressure may be manually governed by the pilot or other crew member.

This invention consists essentially in means for operating the pressure relief valves 10 to automatically open them when the airplane is landed, and thus to relieve any pressure differential that may exist between the sealed interior of the airplane and the atmosphere on the ground before the doors or any other exits are opened. As shown in Fig. 1, this is accomplished by interconnecting the valves 10 through tubes 12 to a fitting 11 which is also connected through a tube 13 to a landing gear actuated bleed valve 14.

The landing gear of the airplane A includes conventionally a wheel or ground engaging member 20 which is resiliently mounted on a strut 21 comprising an upper tubular member 22, a lower strut member 23, and a pair of anti-torque links or frames 24 and 25. The links 24 and 25 are connected to a common pivot at 26 and to the upper and lower strut members 22 and 23, at pivots 27 and 28 respectively. The pivoted links 24 and 25 prevent relative rotation of the members 22 and 23 while permitting telescopic movement within each other.

The weight of the aircraft landing retracts the strut member 23 in the tubular member 22 and causes rotation of the links 24 and 25 in a vertical plane around their pivots. As shown in Fig. 4, the bleed valve 14 is mounted on a projection 22a of the upper tubular member 22 which forms a journal for the link pivot 27. The valve 14 consists essentially of a lower body portion 30 and upper body portion 31 threaded therein at 32, a ball 33 seating against an annular valve seat 34 formed in the lower body portion 30, and a pin 35 journaled in a threaded extension 36 of the lower body portion and engaging the lower surface of the ball 33. Vents 37 communicate from a recess 38 in the lower body portion 30 to the atmosphere. A threaded center bore 39 in the upper body portion 31 accommodates a conventional tube fitting 40 and communicates with an inner recess 41 through an aperture 42. A compression spring 43 is supported in the recess 41 to bias the ball 33 against the valve seat 34.

Referring further to Fig. 4, the valve assembly 14 is supported in such a manner that the pin 35 is supported over the upper end of the link 24 which is provided with a flattened surface 24a such that clearance exists between it and the pin 35 when the landing gear is unloaded, as in flight, and the link 24 is rotated downwardly as shown in full lines. Rotation of links 24 upwardly to the dotted position of Fig. 4 as occurs when the airplane lands, causes a shoulder of the link to engage the pin 35, unseating the ball 33 from the valve seat 34 against the action of the spring 43, to open a passage to the atmosphere through the vents 37, the recess 38, the valve seat 34, the recess 41, the aperture 42, and to the tubing 13.

It will be apparent that the means for actuation of the valve 14 described above is for illustration only and that the mechanism can be made readily applicable to flying boats, or aircraft equipped with floats, skiis, or other ground engaging members.

The relief valve 10 does not per se form a part of this invention and the device shown and described herein is by way of illustration only, as there are several types of valves which may perform the same function that are presently available.

Referring particularly to Fig. 3, the relief valve 10 is shown comprising a frame 50 forming a chamber 51 which is adapted to communicate with the internal or sealed portion of the airplane through ports 52, and a second chamber 53 which is separated from the chamber 51 by a flexible diaphragm 54. The diaphragm 54 is sealed peripherally between the frame 50 and a cover plate 55 suitably fastened thereto. When mounted in the airplane, ports 56 in the frame 50 are so disposed that they communicate between the chamber 51 and the outside atmosphere, but passage of air from inside the airplane to the outside is controlled by the diaphragm 54 which prevents such air flow when in the position shown in full lines of Fig. 3 by effecting a seal against an annular rounded shoulder 57 formed within the frame 50. A vent 61 is mounted in the diaphragm 54 which provides a passage for air between the interior of the airplane and the lower side of the diaphragm 50 and the chamber 53. A compression spring 54a bearing against the lower side of the diaphragm 54 and the cover plate 55 supports the diaphragm and prevents its collapse. A pressure responsive bellows 58 is located centrally of the frame 50, and its interior communicates with the atmosphere through an axial passageway 58a formed in a valve stem 59 which is attached to the bellows 58 at its upper end. A valve disc 59a is formed on the lower end of the valve stem 59 and is adapted to control the flow of air through a passage 55a formed in the cover plate 55, between the chamber 53 and the atmosphere. An adjusting screw 60 threaded into the frame 50 and bearing against the bellows 58 presets the compression of the bellows to maintain the predetermined internal pressure. In normal operation when it is desired that the internal or sealed portion of the airplane be maintained at a higher pressure than that of the surrounding atmosphere within predetermined limits set by the adjustment 60, the diaphragm 54 is subjected to the elevated pressure on both of its sides since the chamber 53 is held at the same pressure as that of the sealed part of the airplane through the vent 61, and as a result the seal effected between the diaphragm 54 and the annular shoulder 57 is maintained so that no air is bled "overboard" through the ports 56. When the internal pressure exceeds the predetermined limit, the bellows 58 is compressed, which unseats the valve disc 59a and opening the passage 55a, subjecting the lower side of the diaphragm 54 to a reduced pressure. The diaphragm 54 is then displaced towards the dotted position, and air from the interior of the airplane is then bled overboard through the ports 56 until the internal pressure is reduced to the desired value.

The tube 12 communicates through a passage 62 in the cover portion 55 to the chamber 53 and is connected thereto by a conventional pipe fitting 63. With the valve 10 in an operative or closed condition, a drop in pressure in the chamber 53 through the tube 12 and passage 63, releases the diaphragm 54 to the dotted position permitting the internal pressure to be released through the ports 56.

To provide a manual control of the release system, the 4-way fitting 11 is connected to a tube 70 in which is installed a shut-off valve or cock 71, leading to an overboard fitting 72, in the side of the sealed portion of the airplane. This exemplifies manually operable means for operating the relief valves 10 to quickly effect a balance of internal and external pressures for emergency or test purposes.

In operation, after take-off the valve 14 is closed by the extension of the landing gear strut when it is relieved of load. The internal pressure of the airplane may then be maintained by the pressurizing system, the pressure relief valve 10 performing under control of the pressurizing system. On landing the valve 14 is opened to atmosphere which in turn operates the pressure relief valves 10 to immediately equalize the internal and external pressures.

The invention as herein described exemplifies means for automatically equalizing the internal pressure of a pressurized aircraft to existing ground atmospheric pressure conditions upon contact with the ground or other landing surface. It will be understood that the principles embodied herein are not limited to the particular form shown but may be modified within the scope of the appended claims without departing from the spirit of the invention.

Having thus described the invention, what I claim as new and desire to secure by Letters Patent is:

1. In an aircraft, a pressurized fuselage adapted to be maintained at a predetermined pressure independent of the atmospheric pressure, a relief valve in said fuselage to automatically exhaust said fuselage to the atmosphere when the pressure therein exceeds the predetermined value, a landing gear on said aircraft, a bleed valve associated with said landing gear having an operative connection with said relief valve, and means on said landing gear to operate said bleed valve to open said relief valve when the load of the aircraft is supported by said landing gear thereby to equalize automatically the internal pressure of said fuselage with the atmospheric pressure.

2. In an aircraft, a pressurized fuselage adapted to be maintained at a predetermined pressure independent of the atmospheric pressure, a relief valve in said fuselage communicating between the interior of the fuselage and the atmosphere and operable to exhaust automatically said fuselage to the atmosphere when the pressure within said fuselage exceeds the predetermined value, a landing gear on said aircraft including an oleo strut, a bleed valve associated with said oleo strut having an operative connection with said relief valve, and means on said oleo strut to operate said bleed valve to open said relief valve when the load of the aircraft is supported by said landing gear thereby to equalize automatically the internal pressure of said fuselage with the atmospheric pressure.

3. In an aircraft, a pressurized fuselage adapted to be maintained at a predetermined pressure independent of the atmospheric pressure, a relief valve in said fuselage communicating between the interior of the fuselage and the atmosphere and operable to exhaust automatically said fuselage to the atmosphere when the pressure therein exceeds the predetermined value, a landing gear on said aircraft, actuating means associated with said landing gear having an operative connection with said relief valve, means on said landing gear to operate said actuating means to open said relief valve when the load of the aircraft is supported by said landing gear thereby to equalize automatically the internal pressure of said fuselage with the atmospheric pressure, and a manually controlled valve in said fuselage operatively connected to said relief valve for by-passing said actuating means and opening said relief valve to equalize said internal pressure and the atmospheric pressure.

4. In an aircraft, a pressurized fuselage adapted to be maintained at a predetermined pressure independent of the atmospheric pressure, a relief valve in said fuselage communicating between the interior of the fuselage and the atmosphere and operable to exhaust automatically said fuselage to the atmosphere when the pressure within said fuselage exceeds the predetermined value, a landing gear on said aircraft including an oleo strut, a bleed valve associated with said oleo strut having an operative connection with said relief valve, means on said oleo strut to operate said bleed valve to open said relief valve when the load of the aircraft is supported by said landing gear thereby to equalize automatically the internal pressure of said fuselage with the atmospheric pressure, and a manually controlled valve supported in said fuselage and operatively connected to said relief valve for by-passing said bleed valve and opening said relief valve to equalize the internal pressure and the atmospheric pressure.

JOHN J. DRANEY.

REFERENCES CITED

The following references are of record in the file of this patent:

UNITED STATES PATENTS

| Number | Name | Date |
| --- | --- | --- |
| 1,562,663 | Strong | Nov. 24, 1925 |
| 1,775,583 | Boucher et al. | Sept. 9, 1930 |
| 2,063,477 | Young et al. | Dec. 8, 1936 |
| 2,173,273 | De Seversky | Sept. 19, 1939 |
| 2,321,582 | Crane et al. | June 15, 1943 |
| 2,331,108 | DeGanahl | Oct. 5, 1943 |
| 2,358,835 | Streid | Sept. 26, 1944 |